UNITED STATES PATENT OFFICE.

ERNEST HUMBERT, OF NIAGARA FALLS, NEW YORK.

MAKING LOW-CARBON MANGANESE ALLOYS.

1,228,925.   Specification of Letters Patent.   Patented June 5, 1917.

No Drawing.   Application filed March 6, 1914. Serial No. 822,878.

*To all whom it may concern:*

Be it known that I, ERNEST HUMBERT, a citizen of the Republic of France, residing in Niagara Falls, New York, have invented certain new and useful Improvements in Making Low-Carbon Manganese Alloys, of which the following is a specification.

Commercial ferro-manganese contains about six per cent. carbon. For many purposes it is of great value to have a lower percentage of carbon. My invention provides a method by which the carbon may be reduced to as low as 0.5 per cent. I accomplish the desired reduction by treating the commercial ferro-manganese with manganese oxid at a suitable temperature. An electric furnace is used in order to secure the desired temperatures and in order to control the temperature accurately; preferably a furnace of the electrode type such as the Heroult arc furnace. The oxygen of the manganese oxid unites with a part of the carbon and escapes as a gas while manganese reduced from the oxid goes into the bath to increase the manganese content thereof.

The affinity of the oxygen contained in the ore for the carbon in the ferro-manganese reaches a maximum point at about 1400° centigrade and falls off rapidly just below and just above this temperature so that a very careful and accurate control of the temperature is necessary if we are to work at this point. However, above 1700° centigrade the affinity increases rapidly and becomes greater than the affinity at 1400°. With the electric arc furnace these temperatures above 1700° are easily obtainable and controllable and a range of temperatures above 1700° at which the affinity continues high is sufficient to permit an easy carrying out of the process. These temperatures may also be attained in the electric induction furnace, but an arc furnace gives a better application of the heat.

The following is a specific example of my process. Take 2,000 pounds of ferro-manganese containing 6% carbon. This is 120 pounds of carbon and requires 160 pounds of oxygen. This amount of oxygen will be found in 710 pounds of manganese oxid (MnO). If the reaction were perfect there would result 2,000 minus 120 plus 550, a total of 2430 pounds of ferro-manganese containing no carbon. These calculations are for pure oxid of manganese. As commercial manganese ore is never pure MnO the calculations must be made on the MnO content. Also a certain excess of the oxid must be used, about ten to twenty per cent. over the theoretical amount, because a certain amount of the oxid remains in the slag. The ferro-manganese is introduced into the furnace either cold or molten. If cold it is first melted in the electric furnace. The manganese oxid is then added. Probably the best voltage to use is fifty volts at each arc, but it may be varied according to the design of the furnace and other considerations. The quantity of current, amperes, should be sufficient to keep the mass at the temperatures stated. A test of the metal will show a reduction of carbon by the appearance of the fracture, being less crystalline and more like steel than in high carbon ferro-manganese. Also the specimen will be less brittle the lower the carbon.

The low carbon content of the bath being assured, the slag should be tested for manganese. If the slag is white there is practically no manganese left in it; if green, a small quantity of manganese; if greenish brown, a large quantity of manganese. Where a large quantity of manganese is indicated in the slag I throw a reducing agent upon the slag while the charge is in the liquid state, and thus utilize the manganese of the slag as far as possible. Coke dust or ferro-silicon may be conveniently used for this purpose, the former being best adapted for electric arc furnaces and the latter for induction furnaces. The coke dust or ferro-silicon reduces a certain amount of oxid of manganese without materially increasing the carbon or silicon in the bath, but causing an additional amount of manganese to enter the bath.

By suitably varying the proportions the percentage of carbon can be reduced to any desired extent between 6% and 0.5%, or from almost any higher carbon content to any desired lower carbon content. The same process may be applied to other manganese alloys in which it is desired to reduce the carbon content.

The low carbon ferro-manganese produced by this method is of a special utility in the making of what is commercially known as manganese steel containing a comparatively high percentage of manganese, ordinarily from ten to fifteen per cent. This steel is valuable for its wearing qualities, having several times the durability of ordinary steel. It is especially difficult to roll, requiring careful quenching operations so that its cost of manufacture into rails or other rolled shapes is very high. When used in the form of rails the comparatively low elastic limit has been found a disadvantage. There is a tendency for the rails to bend and to receive a permanent sag between cross ties of the ordinary railway construction. By using the low carbon ferro-manganese of the present invention in the usual way in order to introduce the required percentage of manganese into the steel such manganese steel can be made with from 0.10% to 0.60% of carbon and this product can be easily rolled without quenching and will have the same durability and a higher elastic limit than the present known commercial manganese steel.

Efforts have been made to decarburize ferro-manganese by fusion with manganese dioxid, experiments having been made in the crucible at temperatures between 1600° and 1700° centigrade as nearly as could be regulated. Such efforts, however, have proven a failure. With my improved process working in the electric furnace and above 1700° centigrade I have succeeded in carrying out the process. Using a Heroult stationary furnace with a charge of 400 pounds of ferro-manganese and 40 pounds of manganese ore I succeeded in reducing the carbon from 6.25% to 0.95% without meeting with any practical difficulties.

What I claim is—

1. Reducing the carbon content of ferro-manganese by adding manganese oxid thereto and electrically heating the mass to a suitable temperature well above 1700 degrees centigrade.

2. The method of treating commercial ferro-manganese containing about 6% carbon which consists in adding manganese oxid thereto and electrically heating the mass to a suitable temperature well above 1700 degrees centigrade to cause the oxidation of the carbon until it is reduced to about one per cent. or less.

3. The method of treating commercial ferro-manganese containing about 6% carbon which consists in adding manganese oxid thereto and subjecting the mass to a temperature well above about 1700° centigrade.

4. Making low carbon ferro-manganese by electrically heating a mixture of manganese oxid and ferro-manganese comparatively high in carbon to a suitable temperature above 1700 degrees centigrade to cause the oxidation of the carbon content of the ferro-manganese to the desired extent, and adding a reducing agent to the slag to reduce a portion of the manganese oxid therein and cause a portion of the manganese in the slag to enter the bath.

5. Reducing the carbon content of a manganese alloy by adding manganese oxid thereto and electrically heating the mass to a suitable temperature well above 1700 degrees centigrade.

In witness whereof, I have hereunto signed my name in the presence of two subscribing witnesses.

ERNEST HUMBERT.

Witnesses:
D. ANTHONY USINA,
LULU STUBENVOLL.